United States Patent [19]

Mischke et al.

[11] Patent Number: 4,703,112

[45] Date of Patent: Oct. 27, 1987

[54] WATER-SOLUBLE BENZOTHIAZOLE-AZO- AND PHENYL-AZO-COMPOUNDS CONTAINING A 2-SULFO-5-ACYLAMINO-ANILINE COUPLING COMPONENT, SUITABLE AS FIBRE-REACTIVE DYESTUFFS

[75] Inventors: Peter Mischke, Bad Soden am Taunus; Ludwig Schläfer, Kelkheim, both of Fed. Rep. of Germany

[73] Assignee: Hoechst Aktiengesellschaft, Frankfurt am Main, Fed. Rep. of Germany

[21] Appl. No.: 926,803

[22] Filed: Oct. 30, 1986

Related U.S. Application Data

[63] Continuation of Ser. No. 621,142, Jun. 18, 1984, abandoned, which is a continuation of Ser. No. 412,107, Aug. 27, 1982, abandoned.

[30] Foreign Application Priority Data

Aug. 31, 1981 [DE] Fed. Rep. of Germany ....... 3124357

[51] Int. Cl.⁴ .................... C09B 62/507; C09B 62/51; D06P 1/38; D06P 3/66
[52] U.S. Cl. .................................. 534/642; 534/581; 534/582; 534/641; 534/643; 534/887
[58] Field of Search ................................ 534/641, 642

[56] References Cited

U.S. PATENT DOCUMENTS

| | | | |
|---|---|---|---|
| 3,169,124 | 2/1965 | Ischer et al. | 260/163 |
| 3,278,515 | 10/1966 | Schmidt-Nickels | 260/163 |
| 3,998,805 | 12/1976 | Koller et al. | 260/207 |
| 4,066,638 | 1/1978 | Fuchs et al. | 260/196 |
| 4,139,527 | 2/1979 | Meininger et al. | 260/199 |
| 4,271,072 | 6/1981 | Wenghofer et al. | 260/207.1 X |

FOREIGN PATENT DOCUMENTS

| | | | |
|---|---|---|---|
| 1911427 | 4/1970 | Fed. Rep. of Germany | 534/638 |
| 45-10789 | 4/1970 | Japan | 534/638 |
| 495464 | 10/1970 | Switzerland | 534/638 |
| 1150978 | 5/1969 | United Kingdom | 534/638 |
| 1302519 | 1/1973 | United Kingdom | 534/638 |
| 2074599 | 11/1981 | United Kingdom | 534/638 |

*Primary Examiner*—Floyd D. Higel

*Attorney, Agent, or Firm*—Curtis, Morris & Safford

[57] ABSTRACT

Water-soluble azo compounds, having fiber-reactive properties and yielding (for instance, on cellulose fiber materials) deep and fast dyeings and prints, of the formula

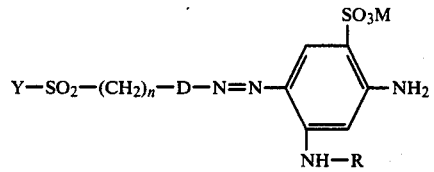

in which D is phenylene which can be substituted by one or two subtituents from the group consisting of lower alkyl, lower alkoxy, hydroxy, lower alkanoylamino, benzoylamino, benzoylamino substituted by lower alkyl, lower alkoxy, chlorine and/or sulfo, chlorine, bromine, fluorine and carboxy and/or by a nitro group and/or by a further group of the formula Y—SO$_2$—(CH$_2$)$_n$— in which Y has the meaning given below and n here is 1 or 2, or D is naphthylene which can be substituted by one or two substituents from the group consisting of lower alkyl, lower alkoxy, hydroxy, lower alkanoylamine, benzoylamino, benzoylamino substituted by lower alkyl, lower alkoxy, chlorine and/or sulfo, chlorine, bromine, fluorine, carboxy and sulfo and/or by a nitro group, or D is the benzothiazol-2-yl radical which contains the indicated group Y—SO$_2$—(CH$_2$)$_n$— in the carbocyclic ring and can be further substituted in this benzene nucleus by a substituent from the group consisting of lower alkyl, lower alkoxy, hydroxy, lower alkanoylamino, benzoylamino, benzoylamino substituted by lower alkyl, lower alkoxy, chlorine and/or sulfo, nitro, chlorine, bromine and sulfo, M is hydrogen or an equivalent of a metal, R is the acyl group of an optionally substituted lower alkanoic acid, lower alkenoic acid, aromatic carboxylic acid, lower alkanesulfonic acid, aromatic sulfonic acid, carbamic acid or lower alkenesulfonic acid, Y is the vinyl group or a group —CH$_2$—CH$_2$—Z in which Z represents a radical which can be eliminated under alkaline conditions, or the hydroxy group, and n is zero, 1 or 2.

15 Claims, No Drawings

WATER-SOLUBLE BENZOTHIAZOLE-AZO- AND PHENYL-AZO-COMPOUNDS CONTAINING A 2-SULFO-5-ACYLAMINO-ANILINE COUPLING COMPONENT, SUITABLE AS FIBRE-REACTIVE DYESTUFFS

The instant application is a continuation of application Ser. No. 621,142, filed June 18, 1984, now abandoned, which is a continuation of application Ser. No. 412,107, filed Aug. 27, 1982, now abandoned.

The invention relates to the industrial field of water-soluble azo dyestuffs having fiber-reactive properties.

Japanese Patent Publication Sho 45/10789 and German Offenlegungsschrift 1,911,427 have already disclosed azo dyestuffs which contain a 1,3-diaminobenzene-4-sulfonic acid as coupling component. However, these dyestuffs suffer from certain defects, in particular in respect of the fastness properties of the dyeings prepared with them.

The present invention now provides new water-soluble azo compounds which correspond to the general formula (1)

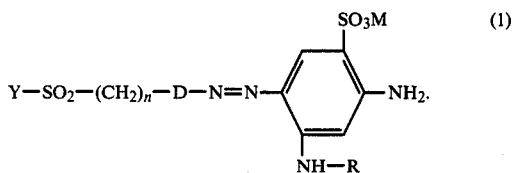

In this general formula (1) D is the phenylene radical which can be further substituted by one or two substituents from the group consisting of lower alkyl, lower alkoxy, hydroxy, lower alkanoylamino, benzoylamino, benzoylamino substituted by lower alkyl, lower alkoxy, chlorine and/or sulfo, chlorine, bromine, fluorine and carboxy and/or by 1 nitro group and/or by a further group of the formula $Y-SO_2-(CH_2)_n-$, in which Y has the meaning mentioned below and n in this case the number 1 or 2, or D is a naphthylene radical which can be further substituted by one or two substituents from the group consisting of lower alkyl, lower alkoxy, hydroxy, lower alkanoylamino, benzoylamino, benzoylamino substituted by lower alkyl, lower alkoxy, chlorine and/or sulfo, chlorine, bromine, fluorine, carboxy and sulfo and/or by 1 nitro group, or D is the benzothiazol-2-yl radical which contains the indicated group of the formula $Y-SO_2-(CH_2)_n-$ in the carbocyclic ring and can be further substituted in this benzene nucleus by a substituent from the group consisting of lower alkyl, lower alkoxy, hydroxy, lower alkanoylamino, benzoylamino, benzoylamino substituted by lower alkyl, lower alkoxy, chlorine and/or sulfo, nitro, chlorine, bromine and sulfo, M is a hydrogen atom or an equivalent of a metal, preferably of an alkali metal or of an alkaline earth metal, such as, in particular, of sodium, potassium or calcium, R is the acyl radical of an optionally substituted lower alkanoic acid, of an optionally substituted lower alkenoic acid, of an optionally substituted aromatic carboxylic acid, of an optionally substituted lower alkanesulfonic acid, of an optionally substituted aromatic sulfonic acid or of the optionally substituted carbamic acid or of a lower alkenesulfonic acid, Y is the vinyl group or a group of the formula $-CH_2-CH_2-Z$ in which Z denotes an inorganic or organic radical which can be eliminated under alkaline conditions, or Z is the hydroxy group, and n represents the number zero, 1 or 2.

The formula radical D is preferably a phenylene radical which is unsubstituted or substituted by 1 or 2 substituents from the group consisting of lower alkyl, such as ethyl and, in particular, methyl, lower alkoxy, such as ethoxy and, in particular, methoxy, and chlorine, or by 1 bromine atom, or D is preferably a naphthylene radical which is unsubstituted or substituted by one or two, preferably one, sulfo group.

The abovementioned acyl radical for the formula moiety R is preferably a lower alkanoyl group which can be substituted by chlorine, bromine, lower alkoxy, such as methoxy and ethoxy, phenoxy, phenyl, hydroxy, carboxy or sulfo, as for example, is the formyl, acetyl, propionyl, chloroacetyl, chloropropionyl, butyryl, isobutyryl, phenylacetyl or phenoxyacetyl group, or is preferably a lower alkenoyl group which can be substituted by chlorine, bromine, carboxy or sulfo, as for example, is the monoacyl group of maleic acid, the acryloyl group or the α-bromoacryloyl group, or is preferably a lower alkylsulfonyl group which can be substituted by hydroxy, sulfato, chlorine, bromine or lower alkoxy, such as methoxy or ethoxy, as, for example, is the methylsulfonyl, ethylsulfonyl, β-chloroethylslfonyl, β-bromoethylsulfonyl, β-sulfatoethylsulfonyl, β-hydroxyethylsulfonyl or β-methoxyethylsulfonyl group, or is preferably the benzoyl group which can be substituted by substituents from the group consisting of chlorine, sulfo, lower alkyl, such as methyl and ethyl, lower alkoxy, such as methoxy and ethoxy, hydroxy and carboxy, or is preferably the phenylsulfonyl group which can be substituted by substituents from the group consisting of lower alkyl, such as methyl and ethyl, lower alkoxy, such as methoxy and ethoxy, chlorine, sulfo and carboxy, as, for example, is the p-tosyl group, or is preferably the group of the formula $-CO-NH_2$ which can be monosubstituted or disubstituted at the nitrogen atom by lower alkyl, such as methyl, ethyl, propyl, isopropyl or butyl, by cycloalkyl, such as cyclohexyl, and an optionally substituted aryl group, such as the phenyl group, which can preferably be substituted by substituents from the group consisting of chlorine, sulfo, lower alkyl, lower alkoxy and carboxy, or is the vinylsulfonyl group.

The formula moiety R is particularly preferably the acetyl, propionyl or benzoyl group.

The term "lower" denotes above and below that the alkyl or alkylene or alkenyl radicals contained in the particular groups are those of 1 to 6 C atoms, preferably of 1 to 4 C atoms.

Examples of groups Z which can be eliminated under alkaline conditions are halogen atoms, such as the chlorine, bromine or fluorine atom, ester groups of organic carboxylic and sulfonic acids, such as a lower alkanoyloxy group, for example the acetoxy group, or an acyloxy group of an aromatic carboxylic or sulfonic acid, such as the benzoyloxy, sulfobenzoyloxy, benzenesulfonyloxy or toluenesulfonyloxy group, and further, for example, the monoester groups of phosphoric acid or, in particular, of sulfuric acid or of thiosulfuric acid corresponding to the formulae $-OPO_3M_2$ or $-O-SO_3M$ or $-S-SO_3M$ with M in each case of the above-mentioned meaning, likewise the lower alkylsulfonylamino and arylsulfonylamino groups, the phenoxy group, and the dialkylamino groups having alkyl groups of 1 to 4 C atoms each, such as the dimethylamino and diethylamino group.

The new azo compounds can be in the form of the free acid and in the form of their salts. They are preferably in the form of the salts, in particular the alkali metal and alkaline earth metal salts, especially the sodium, potassium and also calcium salts. The new azo compounds are preferably used in the form of these salts, preferably the alkali metal salts, for dyeing and printing materials containing hydroxy or carboxamide groups, in particular fiber materials.

Of monoazo compounds according to the invention, in particular those can be emphasized which correspond to the general formula (1a)

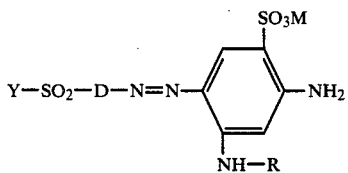

in which M and Y have the abovementioned meanings, Y herein preferably being the vinyl group or the β-sulfatoethyl group, R represents the acetyl or propionyl group and D is a phenylene radical which can be substituted by one or two substituents selected from the group consisting of methyl, ethyl, methoxy, ethoxy, chlorine and bromine, or denotes a naphthylene radical which is unsubstituted or substituted by a sulfo group.

The present invention also relates to processes for preparing the abovementioned and defined azo compounds of the general formula (1). These compounds can be prepared according to the invention by diazotizing a compound of the general formula (2)

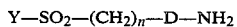

in which D, n and Y have the abovementioned meanings, and coupling the diazotization product with a coupling component of the general formula (3)

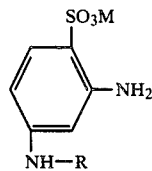

in which R and M have the abovementioned meanings, to give an azo compound of the general formula (1), and if Y represents the β-hydroxyethyl group converting the azo compound of the formula (1) containing this β-hydroxyethyl group with the aid of a sulfating agent into the corresponding azo compound of the formula (1), in which Y represents the β-sulfatoethyl group, or by means of a phosphating agent into the corresponding compound of the formula (1) in which Y represents the β-phosphatoethyl group.

Examples of suitable sulfating agents are 90 to 100% strength sulfuric acid, chlorosulfonic acid, sulfamic acid or other compounds giving off sulfur trioxide. Examples of suitable phosphating agents are concentrated phosphoric acid, pyrophosphoric, metaphosphoric or polyphosphoric acid, alkyl polyphosphates, phosphorus oxychloride and mixtures of phosphoric acid and phosphorus(V) oxide.

Examples of aromatic amines of the general formula (2), which are used as diazo components in preparing compounds according to the invention, are in particular the following: 4-β-sulfatoethylsulfonylaniline, 4-β-chloroethylsulfonylaniline, 4-β-phosphatoethylsulfonylaniline, 4-vinylsulfonylaniline, 4-β-thiosulfatoethylsulfonylaniline, 2-bromo-4-β-sulfatoethylsulfonylaniline, 2-chloro-4-β-sulfatoethylsulfonylaniline, 2-chloro-5-β-chloroethylsulfonylaniline, 3-β-sulfatoethylsulfonylaniline, 2-bromo-5-β-sulfatoethylsulfonylaniline, 2,6-dichloro-4-β-sulfatoethylsulfonylaniline, 2,6-dibromo-4-β-sulfatoethylsulfonylaniline, 2,5-dichloro-4-β-sulfatoethylsulfonylaniline, 2-methyl-5-β-sulfatoethylsulfonylaniline, 2-methoxy-5-β-sulfatoethylsulfonylaniline, 2-methoxy-4-β-sulfatoethylsulfonylaniline, 2-methyl-6-chloro-4-β-sulfatoethylsulfonylaniline, 2,6-dimethyl-4-β-sulfatoethylsulfonylaniline, 2,6-dimethyl-3-β-sulfatoethylsulfonylaniline, 2,5-dimethoxy-4-β-sulfatoethylsulfonylaniline, 2-methoxy-5-methyl-4-β-sulfatoethylsulfonylaniline, 2-nitro-4-β-sulfatoethylsulfonylaniline, 4-nitro-2-β-sulfatoethylsulfonylaniline, 6-β-sulfatoethylsulfonyl-2-naphthylamine, 1-sulfo-6-β-sulfatoethylsulfonyl-2-naphthylamine, 8-β-sulfatoethylsulfonyl-2-naphthylamine, 6sulfo-8-β-sulfatoethylsulfonyl-2-naphthylamine, 6-β-vinylsulfonyl-2-aminobenzothiazole, 6-β-sulfatoethylsulfonyl-2-aminobenzothiazole, 4-ω-(β-sulfatoethylsulfonyl)-tolylamine, 3-ω-(β-sulfatoethylsulfonyl)-tolylamine, 6-methoxy-3-ω-(β-sulfatoethylsulfonyl)-tolylamine, 4-methoxy-3-ω-(β-sulfatoethylsulfonyl)-tolylamine, 4-methyl-3,5-bis-(β-sulfatoethylsulfonylmethyl)-aniline, 4-ω-(β-sulfatoethylsulfonyl)-ethylaniline, 3-ω-(β-sulfatoethylsulfonyl)-ethylaniline, 5-(β-sulfatoethylsulfonylmethyl)-1-naphthylamine or their β-hydroxyethylsulfonyl or, for example, β-chloroethylsulfonyl, β-acetoxyethylsulfonyl and β-phosphatoethylsulfonyl or vinylsulfonyl derivatives. Compounds of the formula (2) are known and can be prepared in the manner extensively described in the literature. For example, preferable compounds of the formula (2), having a β-sulfatoethylsulfonyl group, can be obtained from the corresponding β-hydroxyethylsulfonyl compounds by esterification, such as, for example, described in German Pat. No. 1,150,163 or in German Pat. No. 1,443,877. The β-sulfatoethylsulfonyl compounds of the formula (2) thus prepared can be used directly, without intermediate isolation from the esterification batch, in the preparation method according to the invention of the synthesis of compounds of the formula (1).

Compounds of the general formula (3), which are used as coupling components in the synthesis of compounds of the general formula (1), can also be prepared in a known manner, thus, for example, by monoacylating 1,3-diaminobenzene-4-sulfonic acid with a corresponding acid chloride or acid anhydride of the formula radical R.

Examples of compounds of the general formula (3) are 3-aminoacetanilide-4-sulfonic acid, 3-aminochloroacetanilide-4-sulfonic acid, 3-aminopropionylaminobenzene-4-sulfonic acid, 3-amino-β-chloropropionylaminobenzene-4-sulfonic acid, 3-amino-β-sulfopropionylaminobenzene-4-sulfonic acid, 3-aminoacryloylaminobenzene-4-sulfonic acid, 3-aminoisobutyrylaminobenzene-4-sulfonic acid, 3-amino-α-bromoacryloylaminobenzene-4-sulfonic acid, 3-aminophenylacetylaminobenzene-4-sulfonic acid, 3-aminomethoxyacetylaminobenzene-4-sulfonic acid, 3-aminosuccinylaminobenzene-4-sulfonic acid, 3-amino-β-carboxyacryloylaminobenzene-4-sulfonic acid, 3- aminophenoxyacetylaminobenzene-4-sulfonic acid, 3-aminobenzylaminobenzene-4-sulfonic acid, 3-amino-4'-methylbenzoylaminobenzene-4-sulfonic acid, 3-amino-3'-chlorobenzoylaminobenzene-4-sulfonic acid, 3-amino-2'-methoxybenzoylaminobenzene-4-sulfonic acid, 3-amino-2'-carboxybenzoylaminobenzene-4-sulfonic acid, 3-amino-3'-sulfobenzoylaminobenzene-4-sulfonic acid, 3-aminomethanesulfonylaminobenzene-4-sulfonic acid, 3-aminoethanesulfonylaminobenzene-4-sulfonic acid, 3-amino-β-hydroxyethylsulfonylaminobenzene-4-sulfonic acid, 3-aminovinylsulfonylaminobenzene-4-sulfonic acid, 3-amino-β-sulfatoethylsulfonylaminobenzene-4-sulfonic acid, 3-amino-β-bromoethylsulfonylaminobenzene-4-sulfonic acid, 3-aminobenzenesulfonylaminobenzene-4-sulfonic acid, 3-amino-p-tosylaminobenzene-4-sulfonic acid, 3-aminoureidobenzene-4-sulfonic acid, 3-amino-N'-isopropylureidobenzene-4-sulfonic acid, 3-amino-N'-cyclohexylureidobenzene-4-sulfonic acid, 3-amino-N'-phenylureidobenzene-4-sulfonic acid, 3-amino-N'-(4'-chlorophenyl)-ureidobenzene-4-sulfonic acid, and 3-amino-N'-(3',4'-dichlorophenyl)-ureidobenzene-4-sulfonic acid.

Amines of the general formula (2) can be diazotized by generally known methods, for example by treatment with an alkali metal nitrite and an inorganic acid, such as hydrochloric acid, sulfuric acid or phosphoric acid, or by means of nitrosylsulfuric acid.

The couping with coupling components of the formula (3) can also be carried out in a manner which is in itself known, in a neutral to acidic medium, preferably within a pH range between 1 and 5, preferably between 2.5 and 4, and at a temperature between −5° C. and +25° C., if appropriate in the presence of sodium acetate or similar buffer substances or catalysts affecting the rate of coupling, such as, for example, dimethylformamide or pyridine.

The compounds prepared according to the invention, of the formula (1), can be precipitated from the reaction solution by salting out by means of electrolytes, for example, sodium chloride or potassium chloride, advantageously after the reaction mixture has been adjusted to a pH value of 3.5 to 7.0; after the compounds have been filtered off they are dried. Compounds according to the invention can also be isolated from their synthesis batches by evaporating to dryness or spray-drying. It is also possible to use solutions of compounds of the formula (1) obtained after the snythesis directly as a liquid composition for dyeing, if appropriate after buffer substances have been added.

The new compounds of the formula (1) are suitable for use as dyestuffs, in particular as fiber-reactive dyestuffs; they can be applied, and fixed to give fast results, preferably to the substrates mentioned below, by the application methods known for reactive dyestuffs.

The present invention accordingly also relates to the use of compounds of the formula (1) as dyestuffs for dyeing and printing the initially mentioned materials, in particular materials made of cellulose fibers and/or natural and/or synthetic polyamide fibers, or leather, or, rather, to a process for dyeing and printing the materials mentioned, thus cellulose fiber materials or natural or synthetic polyamide fiber materials or leather, using compounds of the formula (1). Preferable cellulose fiber materials are cotton and regenerated cellulose, such as filament viscose, and linen, hemp and jute. Suitable polyamide fiber materials are, in particular, wool and other animal hairs and silk, and among synthetic polyamides in particular polyamide-6,6, polyamide-6, polyamide-11 or polyamide-4.

For example, the azo compounds according to the invention produce dyeings having a very good color yield, from a long liquor, on cellulose fibers by the exhaust method with the use of a very wide variety of added alkali. They also produce excellent color yields on dyeing cellulose fibers by the known padding methods, in which the compound (1) can be fixed by means of alkali by leaving the dyeing to stand at room temperature, by steaming or by means of dry heat. In the printing methods, it is likewise possible to use the customary one-step methods in the presence of an acid-binding agent or of an alkali-donating agent, such as, for example, sodium bicarbonate, sodium carbonate or sodium trichloroacetate, in the print paste with subsequent fixing by steaming, for example at 101° to 103° C., or the two-step methods with the use of neutral or weakly acidic print pastes where, after having been printed with print pastes, the fiber material is either passed through a hot electrolyte-containing alkaline bath or overpadded with an alkaline electrolyte-containing padding liquor, and the overpadded dyestuff is then fixed by steaming or dry heat. These methods produce deep prints having well-delineated contours and a clear white ground. The quality of the prints is virtually not affected by varying fixing conditions, and they accordingly display a satisfactory constancy of shade.

The compounds according to the invention are distinguished over the structurally most comparable dyestuffs of Japanese Patent Publication Sho 45/10789 and of German Offenlegungsschrift 1,911,427 by clearer shades, considerably better light and acid fastness properties, and by better perspiration and acidic cross-dyeing fastness properties; their shades are in the same way not affected in the crease-resist finishing of the dyed or printed fabric.

Dyeings or prints obtained with compounds of the formula (1) on cellulose fiber materials have considerable fastness properties; of these in particular the most important manufacturing and end-use fastness properties are to be emphasised, such as the light fastness properties on moist or dry fiber material, the wash fastness at 60° C. and 95° C., the fastness to soda boiling, the acidic and alkaline fulling fastness, the water fastness, the seawater fastness, the acidic cross-dyeing fastness, the alkaline and acidic perspiration fastness, the fastness to pleating, ironing and rubbing and the fastness to chlorinated water and gas fume fading. Neither do copper salts, even in the presence of peroxide-containing washing agents, change the shade of dyeings and prints. Similarly, the shade is not changed by a synthetic resin finish.

Not only the natural but also the synthetic polyamide fiber materials are dyed with the new compounds of the formula (1) preferably from an acidic, aqueous dyebath or an acidic, aqueous dyeing liquor. The desired pH value of the dyebath or dyeing liquor is preferably adjusted with acetic acid or acetic acid and ammonium acetate or sodium acetate. To achieve satisfactory levelness of the dyes, or to improve their levelness, it is advantageous to use in addition customary levelling auxiliaries, for example compounds based on a reaction product of a fatty amine, such as, for example, stearylamine, with an alkylene oxide, such as ethylene oxide, or on a reaction product of cyanuric chloride with the approximately 3-fold molar amount of an aminobenzenesulfonic acid and/or of an aminonaphthalenesulfonic acid, in the dyebath or in the dyeing liquor. The dyeings can customarily be carried out at temperatures of 60° to 100° C., preferably in the exhaust method, in particular at the boiling temperature of the dyebath, or also in a pressure dyeing apparatus at temperatures of about 110° to 120° C.

The examples which follow serve to illustrate the invention. The parts mentioned therein are parts by weight, and percentage data represent percentages by weight unless otherwise stated. Parts by weight relate to parts by volume as kilogram relates to liter. Compounds described by formulae in the examples which follow are shown in the form of the free acids; in general, they are prepared and isolated in the form of their sodium or potassium salts and used for dyeing in the form of their salts. Similarly, the starting compounds and the compounds mentioned in the examples which follow, in particular the tabled examples, in the form of the free acid can be used in the synthesis as such or in the form of their salts, preferably alkali metal salts, such as the sodium or potassium salt.

EXAMPLE 1

28.1 parts of 4-β-sulfatoethylsulfonylaniline are added with stirring to 300 parts of water; 36 parts of 31% strength hydrochloric acid are then added, and the suspension is cooled down to about 5° C. 20 parts by volume of an aqueous 5N sodium nitrite solution are then slowly added dropwise at this temperature, and, afterwards, the mixture is stirred for about 1 to 2 hours. Excess nitrous acid is destroyed with a small amount of sulfamic acid.

For the coupling reaction, an aqueous solution of 23 parts of 3-aminoacetanilide-4-sulfonic acid is added, and the pH value is adjusted to about 4 by the gradual addition of sodium bicarbonate. After the coupling is complete, the pH value is adjusted to 5.5 to 6.0, and the azo compound formed is isolated by spray-drying the aqueous solution.

A yellow-orange, electrolyte-containing powder is obtained which contains the sodium salt of the compound of the formula

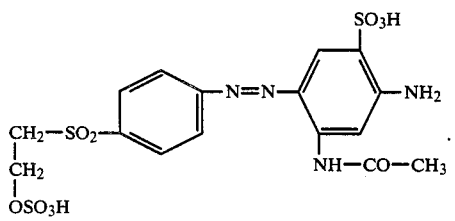

This compound has very good dyestuff properties and is very highly suitable for dyeing (including printing), for example, cellulose fibers, such as cotton, by the application and fixing methods customary for fiber-reactive dyestuffs; it produces clear, golden yellow dyeings and prints having good light and wet fastness properties. Good dyeings and prints distinguished by clear, golden yellow shades of high tinctorial strength and by very good light and wet fastness properties are also obtained on wool.

EXAMPLE 1a

The procedure given in Example 1 for preparing an azo compound according to the invention is followed, but 24.4 parts of 3-aminopropionylaminobenzene-4-sulfonic acid are used instead of the coupling component used there. After the synthesis batch has been worked up, the sodium salt of the compound of the formula

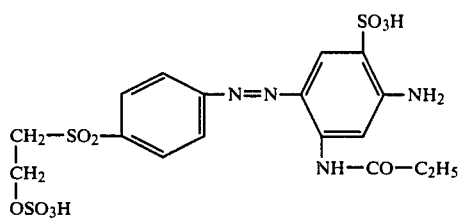

and which also represents a valuable dyestuff having fiber-reactive properties is obtained. This compound according to the invention likewise dyes cellulose fiber materials by the application and fixing methods customary for fiber-reactive dyestuffs in clear, golden yellow shades having good light and wet fastness properties. The compound also produces on wool deep, level dyeings having a clear, golden yellow shade with very good light and wet fastness properties.

EXAMPLE 2

31.1 parts of 2-methoxy-5-β-sulfatoethylsulfonylaniline are added with stirring to 280 parts of water; after 36 parts of 31% strength hydrochloric acid have been added, the suspension is cooled down to 5° C. 20 parts by volume of an aqueous 5N sodium nitrite solution are then slowly added dropwise at this temperature, and, afterwards, the reaction batch is stirred for approximately another hour. Excess nitrous acid is then destroyed with a small amount of sulfamic acid.

To carry out the coupling reaction, a solution of 23 parts of 3-aminoacetanilide-4-sulfonic acid in about 150 parts of water is added to the above diazonium salt solution, the pH value being adjusted to and maintained at about 4 by means of sodium bicarbonate. After the coupling is complete, the pH value is increased to 5.5 to 6, and the resulting azo compound according to the invention is precipitated by potassium chloride, filtered off with suction and dried under reduced pressure at 60° C. (The azo compound can also be isolated by spray-drying the aqueous solution).

A golden yellow, electrolyte-containing powder is obtained which contains an alkali metal salt, such as predominantly the potassium salt (or the sodium salt) of the formula

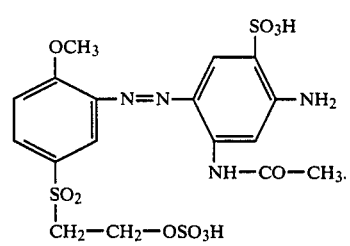

The compound according to the invention is highly suitable for use as a dyestuff and produces by the application and fixing methods customary and known for fiber-reactive dyestuffs, on cotton and wool, clear, only slightly reddish yellow dyeings and prints having the very good fastness properties which have been previously mentioned in the descriptive section.

EXAMPLE 2a

The procedures given in Example 2 for preparing an azo compound according to the invention are followed, but the coupling component used there is replaced by 24.4 parts of 3-aminopropionylaminobenzene-4-sulfonic acid. The corresponding azo compound according to the invention, with the propionylamino group in the coupling component, is obtained. This compound according to the invention likewise has very good dyestuff properties and produces, for example on cotton, dyeings and prints having the same shade and the same good fastness properties.

EXAMPLE 3

36 parts of 4-β-sulfatoethylsulfonyl-2-bromoaniline are dissolved in 200 parts of water with the addition of 11.5 parts of sodium bicarbonate; 20 parts by volume of an aqueous 5N sodium nitrite solution are then added. This mixture, after cooling down to 0° to 5° C., is poured into a mixture of 100 parts of ice and 36 parts by volume of a 31% strength aqueous hydrochloric acid. Some of the diazonium compound formed precipitates in this step. The mixture is stirred for a further one hour at 0° to 5° C., and excess nitrous acid is then destroyed with a small amount of sulfamic acid.

To carry out the coupling reaction, this diazonium salt suspension is added in small portions to a cold solution at approximately 10° C. of 23 parts of 3-aminoacetanilide-4-sulfonic acid in 200 parts of water; the pH value of the coupling solution is maintained between 4 and 5 by sprinkling in sodium acetate. The coupling reaction is complete after about 2 hours. The azo compound, according to the invention, formed is isolated by spray-drying.

A brownish, electrolyte-containing powder is obtained which contains the sodium salt of the compound of the formula

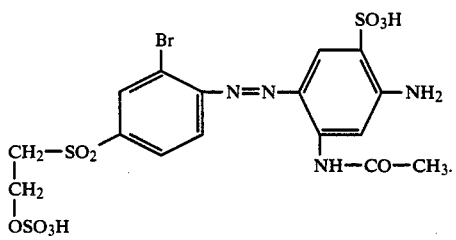

This compound has very good fiber-reactive dyestuff properties and produces on cotton and wool by the fixing methods customary for fiber-reactive dyestuffs deep, yellowish orange dyeings and prints having very good fastness properties.

EXAMPLE 4

34.1 parts of 1-amino-2,5-dimethoxy-4-(β-sulfatoethylsulfonyl)-benzene are diazotized in accordance with the instructions of Example 1, and the diazotization product is coupled with an aqueous solution of 24.4 parts of 3-aminopropionylaminobenzene-4-sulfonic acid. The resulting azo compound according to the invention is isolated by spray-drying.

A red-brown, electrolyte-containing powder is obtained which contains the sodium salt of the compound of the formula

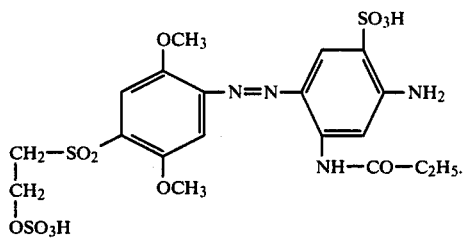

The compound is very highly suitable for use as a fiber-reactive dyestuff for dyeing (including printing) cotton and wool; it produces on these materials golden orange dyeings and prints having good fastness properties.

EXAMPLE 5

The procedure given in Example 1 for diazotizing and coupling is followed, but 32.1 parts of 3-amino-α-bromoacryloylaminobenzene-4-sulfonic acid is used instead of the coupling component indicated there. After the synthesis is complete, the reaction solution is spray-dried. An orange-brown, electrolyte-containing powder is obtained which contains the sodium salt of the compound of the formula

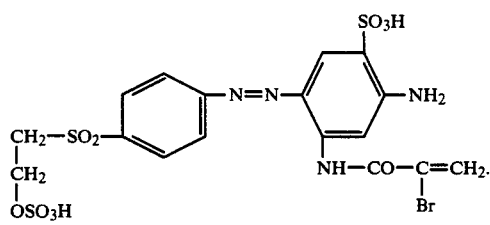

This azo compound according to the invention produces on cotton and wool by the dyeing methods customary for fiber-reactive dyestuffs golden yellow dyeings and prints having very good light and wet fastness properties, such as, for example, the fastness properties mentioned in the descriptive section.

EXAMPLE 6

The procedure given in Example 1 for preparing an azo compound according to the invention is followed, but the coupling component used there is replaced by 29.2 parts of 3-aminobenzoylaminobenzene-4-sulfonic acid. After the azo compound prepared has been isolated by spray-drying, an electrolyte-containing yellow-brown powder containing the sodium salt of the compound of the formula

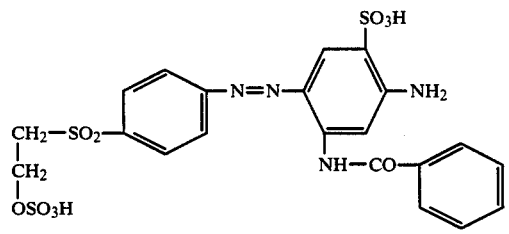

is obtained. This azo compound according to the invention has very good fiber-reactive dyestuff properties and produces in a customary manner on cotton and wool clear, reddish yellow dyeings and prints having good light fastness and very good stability to wash treatments.

EXAMPLE 7

The procedure of Example 1 is followed, but the coupling component used there is replaced by 34.2 parts of 3-amino-p-tosylaminobenzene-4-sulfonic acid. After the product has been isolated, the sodium salt of the compound of the formula

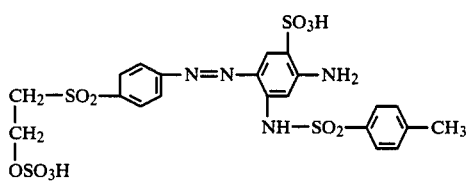

which produces on cotton and wool dyeings and prints having a deep reddish yellow shade and good fastness properties is obtained.

EXAMPLE 8

A solution, rendered neutral, of 41.1 parts of 2-amino-8-(β-sulfatoethylsulfonyl)-naphthalene-6-sulfonic acid in about 250 parts of water is treated with 20 parts by volume of an aqueous 5N sodium nitrite solution. This solution is added slowly to a mixture of 200 parts of ice and 35 parts of a 31% strength aqueous hydrochloric acid; the diazotization reaction is continued at about 10° C. with subsequent stirring for one hour. After the reaction is complete, excess nitrous acid is destroyed in a customary manner.

To carry out the coupling reaction, a cooled solution of 27.9 parts of 3-amino-β-chloropropionylaminobenzene-4-sulfonic acid in 150 parts of water is added; the reaction is completed at a pH value of 5.5 to 6. The azo compound, according to the invention, prepared is isolated by spray-drying.

An orange-brown, electrolyte-containing powder containing the sodium salt of the compound of the formula

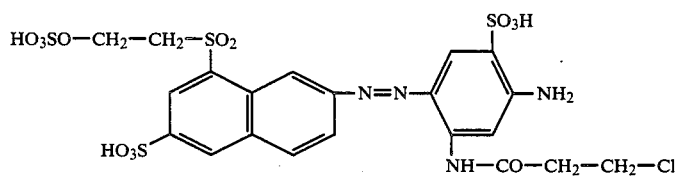

which produces on cellulose fiber materials, such as cotton and also on wool, by the application and fixing methods customary for fiber-reactive dyestuffs, deep, yellowish orange dyeings and prints having good light fastness and very good wet fastness properties, is obtained.

EXAMPLE 9

The procedure given in Example 1 for preparing a compound according to the invention is followed, but the coupling component used there is replaced by 27.3 parts of 3-amino-N′-isopropylureidobenzene-4-sulfonic acid. After the azo compound synthesized has been isolated by spray-drying, a yellow-brown, electrolyte-containing powder is obtained which contains the sodium salt of the compound of the formula

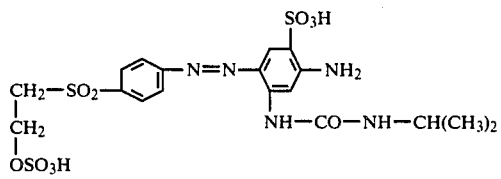

and produces on cotton and wool by the application methods customary on cotton and wool for fiber-reactive dyestuffs deep, golden orange dyeings and prints having good light fastness and very good wash fastness properties.

EXAMPLE 10

The procedure given in Example 2 for preparing an azo compound according to the invention is followed, but the coupling component used there is replaced by 30.7 parts of 3-amino-N′-phenylureidobenzene-4-sulfonic acid. After the batch has been worked up as customary, an alkali metal salt, such as the sodium salt, of the compound of the formula

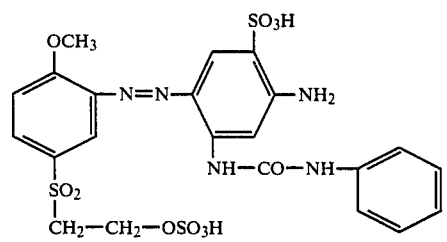

which produces on cotton and wool by the customary application techniques deep, reddish yellow dyeings and prints having good fastness properties is obtained.

EXAMPLE 11

34.1 parts of 1-amino-2,5-dimethoxy-4-(β-sulfatoethylsulfonyl)-benzene are suspended in a mixture of 50 parts of water, 100 parts of ice and 9 parts of concentrated sulfuric acid, and 18 parts of an aqueous, 40% strength sodium nitrite solution are added to this suspension; the mixture is stirred for a further 2 hours, and excess nitrite is then destroyed with a small amount of sulfamic acid.

To carry out the coupling reaction, 23 parts of 3-aminoacetanilide-4-sulfonic acid are added, the acidic coupling mixture is adjusted to a pH value of 2 to 3 by means of about 9 parts of anhydrous sodium carbonate, the coupling temperature is maintained below 12° C. by means of ice, and the batch is then stirred for a further few hours until the coupling is complete. The synthesis solution is then adjusted to a pH value of 5, and the batch is clarified and spray-dried.

A brown-red, electrolyte-containing powder is obtained which contains the sodium salt of the compound of the formula

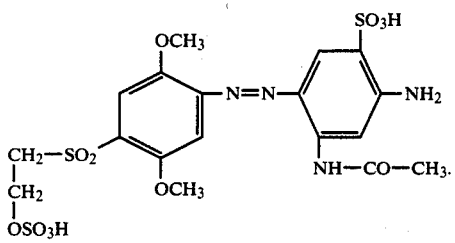

This compound also has very good fiber-reactive dyestuff properties and produces on cellulose fiber materials by the customary application techniques yellowish orange dyeings having the good fastness properties mentioned in the descriptive section.

EXAMPLE 12

An aqueous solution of 7.5 parts of sodium nitrite is slowly added to a suspension of 28.1 parts of 1-amino-4-(β-sulfatoethylsulfonyl)-benzene in 100 parts of water, 100 parts of ice and 21 parts of a concentrated aqueous hydrochloric acid; the mixture is then stirred for a further one hour, and excess nitrite is destroyed with sulfamic acid.

To carry out the coupling reaction, a neutral aqueous solution of 32.2 parts of 3-amino-4-sulfophenylurea (this can be prepared using known procedures from 18.8 parts of 1,3-diaminobenzene-4-sulfonic acid and 8.7 parts of potassium cyanate at a pH value of 5) is added to the diazonium salt suspension thus prepared. The coupling mixture is stirred for a further 3 to 4 hours at a pH value of 2.5, and the pH value of the synthesis solution is adjusted to 4 to 6. The azo compound according to the invention is isolated by spray-drying.

A yellow-brown, electrolyte-containing powder is obtained which contains an alkali metal salt, predominantly the sodium salt, of the compound of the formula

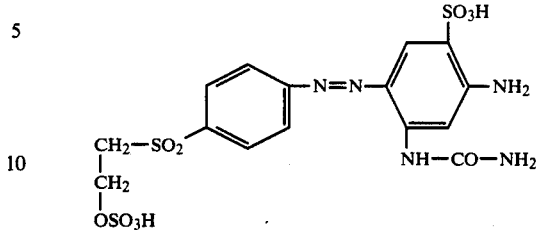

which has good fiber-reactive dyestuff properties and very good affinity from long liquors and produces on cotton by the application and fixing methods customary for fiber-reactive dyestuffs dyeings and prints having a reddish yellow shade and good light and wet fastness properties.

EXAMPLES 13 TO 59

The azo compounds, according to the invention, of the general formula (1) and characterized in the tabled examples below by their diazo components in accordance with the general formula (2) and coupling components in accordance with the general formula (3) can also be prepared in a manner according to the invention, for example in accordance with the procedures of the above illustrative embodiments.

These azo compounds according to the invention also have very good fiber-reactive dyestuff properties together with very good application properties and produce by the application and fixing methods customary for fiber-reactive dyestuffs, on the fiber materials mentioned in the descriptive section, in particular on cellulose fiber materials and wool, dyeings and prints having good to very good fastness properties and the shades indicated for cotton.

| Example | Diazo component corresponding to the general formula (2) | Coupling component corresponding to the general formula (3) | Shade on cotton |
|---|---|---|---|
| 13 | 4-β-Sulfatoethylsulfonyl-aniline | 3-Aminoacryloylaminobenzene-4-sulfonic acid | reddish yellow |
| 14 | 4-β-Sulfatoethylsulfonyl-aniline | 3-Aminoisobutyrylaminobenzene-4-sulfonic acid | reddish yellow |
| 15 | 4-β-Sulfatoethylsulfonyl-aniline | 3-Amino-3'-chlorobenzoylaminobenzene-4-sulfonic acid | yellowish orange |
| 16 | 4-β-Sulfatoethylsulfonyl-aniline | 3-Amino-3'-sulfobenzoylaminobenzene-4-sulfonic acid | yellowish orange |
| 17 | 4-β-Sulfatoethylsulfonyl-aniline | 3-Aminomethanesulfonylaminobenzene-4-sulfonic acid | reddish yellow |
| 18 | 4-β-Sulfatoethylsulfonyl-aniline | 3-Amino-β-hydroxyethylsulfonylamino-benzene-4-sulfonic acid | reddish yellow |
| 19 | 4-β-Sulfatoethylsulfonyl-aniline | 3-Aminobenzenesulfonylaminobenzene-4-sulfonic acid | yellowish orange |
| 20 | 4-β-Sulfatoethylsulfonyl-aniline | 3-Aminochloroacetanilide-4-sulfonic acid | reddish yellow |
| 21 | 4-β-Sulfatoethylsulfonyl-aniline | 3-Amino-N'—cyclohexylureidobenzene-4-sulfonic acid | yellowish orange |
| 22 | 4-Vinylsulfonylaniline | 3-Amino-β-carboxyacryloylaminobenzene-4-sulfonic acid | reddish yellow |
| 23 | 4-β-Phosphatoethylsulfonyl-aniline | 3-Aminopropionylaminobenzene-4-sulfonic acid | reddish yellow |

| Example | Amine (2) | Compound (3) | Shade |
|---|---|---|---|
| 24 | 2-Methoxy-5-β-sulfatoethyl-sulfonylaniline | 3-Aminoisobutyrylaminobenzene-4-sulfonic acid | yellow |
| 25 | 2-Methoxy-5-β-sulfatoethyl-sulfonylaniline | 3-Amino-N'—cyclohexylureidobenzene-4-sulfonic acid | yellowish orange |
| 26 | 2-Methoxy-5-β-sulfatoethyl-sulfonylaniline | 3-Amino-p-tosylaminobenzene-4-sulfonic acid | reddish yellow |
| 27 | 2-Bromo-4-β-sulfatoethyl- | 3-Aminoethanesulfonylaminobenzene- | yellowish orange |

| | | | |
|---|---|---|---|
| 28 | 2-Bromo-4-β-sulfatoethyl-sulfonylaniline | 3-Amino-N'—isopropylureidobenzene-4-sulfonic acid | yellowish orange |
| 29 | 2,6-Dichloro-4-β-sulfato-ethylsulfonylaniline | 3-Aminoacetanilide-4-sulfonic acid | yellow-brown |
| 30 | 3-β-Sulfatoethylsulfonylaniline | 3-Aminoacetanilide-4-sulfonic acid | yellow |
| 31 | 2-Nitro-4-β-sulfatoethyl-sulfonylaniline | 3-Aminoacetanilide-4-sulfonic acid | reddish orange |
| 32 | 2-Carboxy-4-β-sulfatoethyl-sulfonylaniline | 3-Aminobenzoylaminobenzene-4-sulfonic acid | orange |
| 33 | 2-Methoxy-5-methyl-4-β-sulfato-ethylsulfonylaniline | 3-Aminobenzenesulfonylaminobenzene-4-sulfonic acid | yellowish orange |
| 34 | 4-Methoxy-5-β-sulfatoethyl-sulfonylaniline | 3-Aminopropionylaminobenzene-4-sulfonic acid | reddish yellow |
| 35 | 2,5-Dimethoxy-4-β-sulfatoethyl-sulfonylaniline | 3-Aminoureidobenzene-4-sulfonic acid | yellowish orange |
| 36 | 2-Carboxy-5-β-sulfatoethyl sulfonylaniline | 3-Aminoureidobenzene-4-sulfonic acid | yellow orange |
| 37 | 6-β-Sulfatoethylsulfonyl-2-aminonaphthalene-1-sulfonic acid | 3-Amino-N'—(4''-chlorophenyl)-ureido-benzene-4-sulfonic acid | orange |
| 38 | 2,6-Dibromo-4-β-sulfatoethyl-sulfonylaniline | 3-Amino-3'-sulfobenzoylaminobenzene-4-sulfonic acid | reddish yellow |
| 39 | 6-Vinylsulfonyl-2-aminobenzo-thiazole | 3-Aminoacetanilide-4-sulfonic acid | brownish red |
| 40 | 8-β-Sulfatoethylsulfonyl-2-aminonaphthalene | 3-Aminoacetanilide-4-sulfonic acid | yellowish orange |
| 41 | 4-(β-Sulfatoethylsulfonyl-methyl)-aniline | 3-Aminoacetanilide-4-sulfonic acid | yellow |
| 42 | 3,5-bis-(β-Sulfatoethylsul-fonylmethyl)-4-methylaniline | 3-Aminoacetanilide-4-sulfonic acid | golden yellow |
| 43 | 2,5-Dichloro-4-β-sulfato-ethylsulfonylaniline | 3-Aminovinylsulfonylaminobenzene-4-sulfonic acid | yellowish orange |
| 44 | 2,4-Dimethoxy-5-β-sulfato-ethylsufonylaniline | 3-Aminochloropropionylaminobenzene-4-sulfonic acid | orange |
| 45 | 4-β-Sulfatoethylsulfonyl-aniline | 3-Aminosulfopropionylaminobenzene-4-sulfonic acid | reddish yellow |
| 46 | 3-β-Sulfatoethylsulfonylaniline | 3-Aminobenzoylaminobenzene-4-sulfonic acid | yellow |
| 47 | 3-β-Sulfatoethylsulfonylaniline | 3-Aminoureidobenzene-4-sulfonic acid | yellow |
| 48 | 3-β-Sulfatoethylsulfonylaniline | 3-Amino-N'—phenylureidobenzene-4-sulfonic acid | yellow |
| 49 | 2-Methoxy-5-methyl-4-(β-sul-fatoethylsulfonyl)-aniline | 3-Aminoacetanilide-4-sulfonic acid | yellowish orange |
| 50 | 2-Methoxy-5-methyl-4-(β-sul-fatoethylsulfonyl)-aniline | 3-Aminoureidobenzene-4-sulfonic acid | yellowish orange |
| 51 | 2-Methoxy-5-methyl-4-(β-sul-fatoethylsulfonyl)-aniline | 3-Aminobenzanilide-4-sulfonic acid | yellowish orange |
| 52 | 2-Carboxy-5-(β-sulfatoethyl-sulfonyl)-aniline | 3-Aminoacetanilide-4-sulfonic acid | yellowish brown |
| 53 | 4-Methoxy-5-(β-sulfatoethyl-sulfonyl)-aniline | 3-Aminoacetanilide-4-sulfonic acid | reddish yellow |
| 54 | 4-Methoxy-5-(β-sulfatoethyl-sulfonyl)-aniline | 3-Aminobenzanilide-4-sulfonic acid | reddish yellow |
| 55 | 2,4-Dimethoxy-5-(β-sulfato-ethylsulfonyl)-aniline | 3-Aminoacetanilide-4-sulfonic acid | yellowish orange |
| 56 | 2,4-Dimethyl-5-(β-sulfato-ethylsulfonyl)-benzene | 3-Aminoacetanilide-4-sulfonic acid | reddish yellow |
| 57 | 2-Methoxy-5-chloro-4-(β-sul-fatoethylsulfonyl)-aniline | 3-Aminoacetanilide-4-sulfonic acid | yellowish orange |
| 58 | 2-Methoxy-5-chloro-4-(β-sul-fatoethylsulfonyl)-aniline | 3-Aminoureidobenzene-4-sulfonic acid | yellowish orange |

We claim:

1. A water-soluble azo compound of the formula

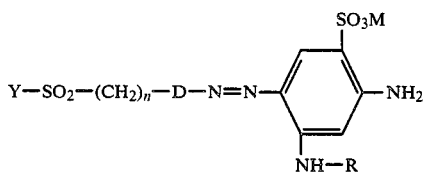

in which
D is phenylene unsubstituted or substituted by one or two substituents selected from the group consisting of lower alkyl, lower alkoxy, hydroxy, lower alkanoylamino, benzoylamino, benzoylamino substituted by one or more of lower alkyl, lower alkoxy, chlorine and sulfo, chlorine, bromine, fluorine and carboxy; or D is phenylene substituted by said one or two substituents and one nitro group; or D is phenylene substituted by said one or two substituents and a group of the formula Y—SO$_2$—(CH$_2$)$_n$— in which Y is as recited hereinafter and n is 1 or 2; or D is phenylene substituted by said one or two substituents, one nitro group and said group of the formula Y—SO$_2$—(CH$_2$)$_n$—; or D is benzothiazol-2-yl which contains said group of the formula Y—SO$_2$—(CH$_2$)$_n$— in the carbocyclic ring, and is otherwise unsubstituted or is further substituted in its benzene nucleus by a substituent selected from the group consisting of lower alkyl, lower alkoxy, hydroxy, lower alkanoylamino, benzoylamino, benzoylamino substituted by one or more of lower alkyl, lower alkoxy, chlorine and sulfo, nitro, chlorine, bromine and sulfo;

M is hydrogen or an alkali metal,

R is lower alkanoyl unsubstituted or substituted by chlorine, bromine, lower alkoxy, phenoxy, phenyl, hydroxy, carboxy or sulfo, or is lower alkenoyl unsubstituted or substituted by chlorine, bromine, carboxy or sulfo, or is lower alkylsulfonyl unsubstituted or substituted by hydroxy, sulfato, chlorine, bromine or lower alkoxy, or is benzoyl unsubstituted or substituted by substituents selected from the group consisting of chlorine, sulfo, lower alkyl, lower alkoxy, hydroxy and carboxy, or is phenysulfonyl unsubstituted or substituted by substituents selected from the group consisting of lower alkyl, lower alkoxy, chlorine, sulfo and carboxy, or is carbamoyl or carbamoyl monosubstituted or disubstituted at the nitrogen atom by lower alkyl, cycloalkyl and phenyl unsubstituted or substituted by substituents selected from the group consisting of chlorine, sulfo, lower alkyl, lower alkoxy and carboxy, or is vinylsulfonyl, and Y is vinyl or a group of the formula —CH$_2$—CH$_2$—Z in which Z is halogen, lower alkanoyloxy, benzoyloxy, sulfobenzoyloxy, benzenesulfonyloxy, toluenesulfonyloxy, phosphato, sulfato, thiosulfato, lower alkylsulfonylamino, arylsulfonylamino, phenoxy or dialkylamino wherein each alkyl is of from 1 to 4 carbon atoms, and n is zero, 1 or 2.

2. A compound according to claim 1, in which D is phenylene unsubstituted or substituted by 1 or 2 substituents selected from the group consisting of lower alkyl, lower alkoxy and chlorine, or by bromine.

3. A compound according to claim 1, in which R is lower alkanoyl unsubstituted or substituted by chlorine, bromine, lower alkoxy, phenoxy, phenyl, hydroxy, carboxy or sulfo, or is lower alkenoyl unsubstituted or substituted by chlorine, bromine, carboxy or sulfo, or is lower alkylsulfonyl unsubstituted or substituted by hydroxy, sulfato, chlorine, bromine or lower alkoxy, or is benzoyl unsubstituted or substituted by substituents selected from the group consisting of chlorine, sulfo, lower alkyl, lower alkoxy, hydroxy and carboxy, or is phenylsulfonyl unsubstituted or substituted by substituents selected from the group consisting of lower alkyl, lower alkoxy, chlorine, sulfo and carboxy, or is carbamoyl or carbamoyl monosubstituted or disubstituted at the nitrogen atom by lower alkyl, cycloalkyl or phenyl unsubstituted or substituted by substituents selected from the group consisting of chlorine, sulfo, lower alkyl, lower alkoxy and carboxy, or is vinylsulfonyl.

4. A compound according to claim 1, in which R is acetyl, propionyl or benzoyl.

5. A compound according to claim 1, in which n is zero.

6. A compound according to claim 1, of the formula

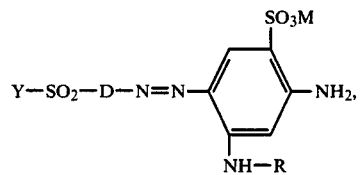

in which R is acetyl or propionyl and D is phenylene unsubstituted or substituted by one or two substituents selected from the group consisting of methyl, ethyl, methoxy, ethoxy, chlorine and bromine.

7. A compound according to claim 1, in which D is here p-phenylene.

8. A compound according to claim 1, of the formula

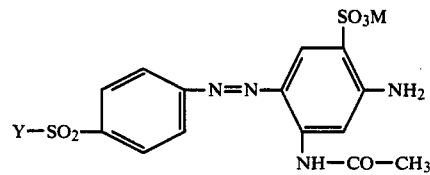

9. A compound according to claim 1 of the formula

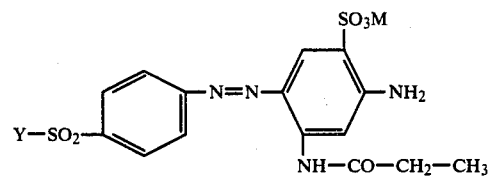

10. A compound according to claim 1, in which Y is vinyl or β-sulfatoethyl.

11. A compound according to claim 1, in which Y is β-sulfatoethyl.

12. A compound according to claim 1, in which M is hydrogen, sodium or potassium.

13. A water-soluble azo compound of the formula

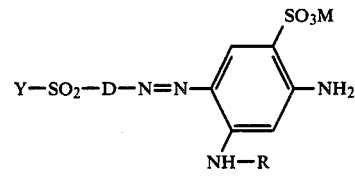

in which
D is phenylene unsubstituted or substituted by one or two substituents selected from the group consisting of lower alkyl, lower alkoxy and chlorine, or by bromine, or
D is the benzothiazol-2-yl which contains the Y—SO$_2$— moiety in the carbocyclic ring and is either not substituted in its benzene nucleus by an additional substituent or substituted by a further substituent selected from the group consisting of lower alkyl, lower alkoxy, hydroxy, lower alkanoylamino benzoylamino, benzoylamino substituted by substituents selected from the group consisting of lower alkyl, lower alkoxy, chlorine and sulfo, nitro, chlorine, bromine and sulfo, M is hydrogen or an alkali metal, R is lower alkanoyl unsubstituted or substituted by chlorine, bromine, lower alkoxy, phenoxy, phenyl, hydroxy, carboxy or sulfo, or is lower alkenoyl unsubstituted or substituted by chlorine, bromine, carboxy or sulfo, or is lower alkylsulfonyl unsubstituted or substituted by hydroxy, sulfato, chlorine, bromine or lower alkoxy, or is benzoyl unsubstituted or substituted by substituents selected from the group consisting of chlorine, sulfo, lower alkyl, lower alkoxy, hydroxy and carboxy, or is phenylsulfonyl unsubstituted or substituted by substituents selected from the group consisting of lower alkyl, lower alkoxy, chlorine, sulfo and carboxy, or is carbamoyl or carbamoyl monosubstituted or disubstituted at the nitrogen atom by lower alkyl, cycloalkyl and phenyl unsubstituted or substituted by substituents selected from the group consisting of chlorine, sulfo, lower alkyl, lower alkoxy and carboxy, or is vinylsulfonyl, and Y is vinyl or a group of the formula $-CH_2-CH_2-Z$ in which Z is halogen, lower alkanoyloxy, benzoyloxy, sulfobenzoyloxy, benzenesulfonyloxy, toluenesulfonyloxy, phosphato, sulfato, thiosulfato, lower alkylsulfonylamino, arylsulfonylamino, phenoxy or dialkylamino wherein each alkyl is of from 1 to 4 carbon atoms.

14. A compound according to claim 13, in which D is phenylene unsubstituted or substituted by 1 or 2 substituents selected from the group consisting of lower alkyl, lower alkoxy and chlorine, or by bromine.

15. A compound according to claim 13, in which Y is β-sulfatoethyl.

* * * * *

UNITED STATES PATENT AND TRADEMARK OFFICE
CERTIFICATE OF CORRECTION

PATENT NO. : 4,703,112

DATED : October 27, 1987

INVENTOR(S) : Mischke et al.

It is certified that error appears in the above-identified patent and that said Letters Patent is hereby corrected as shown below:

Column 17, line 19, change "pheny-" to --phenyl- --;
Column 18, line 64, after "...kanoylamino" insert a comma (,).

Signed and Sealed this

Third Day of May, 1988

Attest:

DONALD J. QUIGG

Attesting Officer

Commissioner of Patents and Trademarks